US012533910B2

(12) United States Patent
Ishizu et al.

(10) Patent No.: US 12,533,910 B2
(45) Date of Patent: Jan. 27, 2026

(54) TIRE

(71) Applicant: The Yokohama Rubber Co., LTD., Tokyo (JP)

(72) Inventors: Kento Ishizu, Kanagawa (JP); Yoshifumi Koishikawa, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 374 days.

(21) Appl. No.: 17/907,625

(22) PCT Filed: Apr. 2, 2021

(86) PCT No.: PCT/JP2021/014331

§ 371 (c)(1), (2) Date: Sep. 28, 2022

(87) PCT Pub. No.: WO2021/201280

PCT Pub. Date: Oct. 7, 2021

(65) Prior Publication Data

US 2023/0191849 A1 Jun. 22, 2023

(30) Foreign Application Priority Data

Apr. 3, 2020 (JP) ................................ 2020-067856

(51) Int. Cl.

*B60C 11/03* (2006.01)
*B60C 11/11* (2006.01)
(Continued)

(52) U.S. Cl.

CPC ........... *B60C 11/0306* (2013.01); *B60C 11/11* (2013.01); *B60C 11/1204* (2013.01);
(Continued)

(58) Field of Classification Search

CPC . B60C 11/11; B60C 11/0306; B60C 11/0304; B60C 1/0346
See application file for complete search history.

(56) References Cited

U.S. PATENT DOCUMENTS 5,733,650 A * 3/1998 Christensen ............ B60C 11/14 106/36
2008/0202658 A1* 8/2008 Ikeda .................... B60C 11/033 152/209.27
(Continued)

FOREIGN PATENT DOCUMENTS

GB 460338 A * 1/1937
JP 61-183203 U1 11/1986
(Continued)

*Primary Examiner* — Justin R Fischer
*Assistant Examiner* — Nicholas J Weiler
(74) *Attorney, Agent, or Firm* — Thorpe North & Western

(57) ABSTRACT

In a tire, width direction edges of lands corresponding to edges of lug grooves include width direction bent portions bent in a circumferential direction. Width direction bent portions closest to a land center portion line and disposed on outer and inner sides in a width direction are outer and inner bent portions, respectively. The lands have a width w1 in the width direction from the outermost side position to the outer bent portion of the lands in the width direction and a width w2 in the width direction from the innermost side position to the inner bent portion of the lands in the width direction, the widths w1, w2 satisfying w2<w1, and a maximum width wb of the lands in the width direction and a width wc between the outer bent portion and the inner bent portion in the width direction satisfy $0.2 \leq (wc/wb) \leq 0.6$.

13 Claims, 7 Drawing Sheets

11(10)
16(15)
31(30)
12(10)
42(41)
43(41)
40(35)
θw
52 (50,35)
θc2
CB
31 (30)
53
37
TIRE CIRCUMFERENTIAL DIRECTION
w2
wc
w1
51 (50,35)
wb
36
43(41)
40(35)
42(41)
31(30)
16(15)
TIRE WIDTH DIRECTION
INNER SIDE
OUTER SIDE

(51) Int. Cl.
*B60C 11/12* (2006.01)
*B60C 11/13* (2006.01)

(52) U.S. Cl.
CPC ... *B60C 11/1369* (2013.01); *B60C 2011/0346* (2013.01); *B60C 2011/1213* (2013.01)

(56) References Cited

U.S. PATENT DOCUMENTS

| | | | | |
|---|---|---|---|---|
| 2016/0121658 | A1 | 5/2016 | Skurich et al. | |
| 2018/0207991 | A1* | 7/2018 | Shibai | B60C 11/12 |
| 2019/0241020 | A1* | 8/2019 | Momozu | B60C 11/11 |

FOREIGN PATENT DOCUMENTS

| | | | |
|---|---|---|---|
| JP | 8-113011 | A | 5/1996 |
| JP | 2001-508725 | A | 7/2001 |
| JP | 2005-289122 | A | 10/2005 |
| JP | 2010-241267 | A | 10/2010 |
| JP | 2015-202818 | A | 11/2015 |
| JP | 5824124 | B2 | 11/2015 |
| JP | 2017-35900 | A | 2/2017 |
| JP | 2017-226368 | A | 12/2017 |
| JP | 2018-012437 | A | 1/2018 |
| JP | 2018-043628 | A | 3/2018 |
| JP | 2018-172059 | A | 11/2018 |
| WO | 2016/063713 | A1 | 4/2016 |

* cited by examiner

| | Conventional Example | Comparative Example 1 | Comparative Example 2 | Comparative Example 3 | Example 1 | Example 2 | Example 3 |
|---|---|---|---|---|---|---|---|
| Relationship between width w1 from outermost side position to outer bent portion and width w2 from innermost side position to inner bent portion | w2 = w1 | w2 > w1 | w2 < w1 | w2 < w1 | w2 < w1 | w2 < w1 | w2 < w1 |
| Ratio (wc/wb) of width wc between outer bent portion and inner bent portion with respect to maximum width wb of land portion | 0.4 | 0.4 | 0.1 | 0.7 | 0.4 | 0.4 | 0.4 |
| Outer side circumferential edge portion has straight shape | Yes | Yes | Yes | Yes | No | Yes | Yes |
| Inner side circumferential edge portion includes circumferential bent portion | No | No | No | No | No | No | Yes |
| Ratio (L3/Lh) of distance L3 between intersection point α and circumferential bent portion with respect to distance Lh between intersection points α and β | - | - | - | - | - | - | 0.2 |
| Ratio (wα/wb) of distance wα between intersection point α and circumferential bent portion with respect to maximum width wb of land portion | - | - | - | - | - | - | 0.05 |
| Ratio (wβ/wb) of distance wβ between intersection point β and circumferential bent portion with respect to maximum width wb of land portion | - | - | - | - | - | - | 0.05 |
| Ratio (w1/wb) of width w1 from outermost side position to outer bent portion with respect to maximum width wb of land portion | 0.2 | 0.2 | 0.2 | 0.2 | 0.2 | 0.2 | 0.2 |
| Ratio (w2/wb) of width w2 from innermost side position to inner bent portion with respect to maximum width wb of land portion | 0.2 | 0.3 | 0.05 | 0.05 | 0.05 | 0.05 | 0.05 |
| Ratio (Lk/Lb) of distance Lk between outer bent portion and inner bent portion with respect to entire length Lb of land portion | 0.02 | 0.02 | 0.02 | 0.02 | 0.02 | 0.02 | 0.02 |
| Dry performance | 100 | 99 | 99 | 99 | 101 | 101 | 101 |
| Wet performance | 100 | 100 | 100 | 100 | 100 | 101 | 101 |
| Performance on ice and snow | 100 | 100 | 100 | 100 | 100 | 100 | 101 |

FIG. 5A

| | Example 4 | Example 5 | Example 6 | Example 7 | Example 8 | Example 9 | Example 10 |
|---|---|---|---|---|---|---|---|
| Relationship between width w1 from outermost side position to outer bent portion and width w2 from innermost side position to inner bent portion | w2 < w1 | w2 < w1 | w2 < w1 | w2 < w1 | w2 < w1 | w2 < w1 | w2 < w1 |
| Ratio (wc/wb) of width wc between outer bent portion and inner bent portion with respect to maximum width wb of land portion | 0.4 | 0.4 | 0.4 | 0.4 | 0.4 | 0.4 | 0.4 |
| Outer side circumferential edge portion has straight shape | Yes | Yes | Yes | Yes | Yes | Yes | Yes |
| Inner side circumferential edge portion includes circumferential bent portion | Yes | Yes | Yes | Yes | Yes | Yes | Yes |
| Ratio (L3/Lh) of distance L3 between intersection point α and circumferential bent portion with respect to distance Lh between intersection points α and β | 0.4 | 0.6 | 0.7 | 0.5 | 0.5 | 0.5 | 0.5 |
| Ratio (wα/wb) of distance wα between intersection point α and circumferential bent portion with respect to maximum width wb of land portion | 0.05 | 0.05 | 0.05 | 0.05 | 0.1 | 0.2 | 0.25 |
| Ratio (wβ/wb) of distance wβ between intersection point β and circumferential bent portion with respect to maximum width wb of land portion | 0.05 | 0.05 | 0.05 | 0.05 | 0.1 | 0.2 | 0.25 |
| Ratio (w1/wb) of width w1 from outermost side position to outer bent portion with respect to maximum width wb of land portion | 0.2 | 0.2 | 0.2 | 0.2 | 0.2 | 0.2 | 0.2 |
| Ratio (w2/wb) of width w2 from innermost side position to inner bent portion with respect to maximum width wb of land portion | 0.05 | 0.05 | 0.05 | 0.05 | 0.05 | 0.05 | 0.05 |
| Ratio (Lk/Lb) of distance Lk between outer bent portion and inner bent portion with respect to entire length Lb of land portion | 0.02 | 0.02 | 0.02 | 0.02 | 0.02 | 0.02 | 0.02 |
| Dry performance | 102 | 102 | 101 | 102 | 102 | 102 | 101 |
| Wet performance | 101 | 101 | 101 | 101 | 101 | 101 | 101 |
| Performance on ice and snow | 102 | 102 | 101 | 102 | 103 | 104 | 105 |

FIG. 5B

| | Example 11 | Example 12 | Example 13 | Example 14 | Example 15 | Example 16 | Example 17 |
|---|---|---|---|---|---|---|---|
| Relationship between width w1 from outermost side position to outer bent portion and width w2 from innermost side position to inner bent portion | w2 < w1 | w2 < w1 | w2 < w1 | w2 < w1 | w2 < w1 | w2 < w1 | w2 < w1 |
| Ratio (wc/wb) of width wc between outer bent portion and inner bent portion with respect to maximum width wb of land portion | 0.4 | 0.4 | 0.4 | 0.4 | 0.4 | 0.4 | 0.4 |
| Outer side circumferential edge portion has straight shape | Yes | Yes | Yes | Yes | Yes | Yes | Yes |
| Inner side circumferential edge portion includes circumferential bent portion | Yes | Yes | Yes | Yes | Yes | Yes | Yes |
| Ratio (L3/Lh) of distance L3 between intersection point α and circumferential bent portion with respect to distance Lh between intersection points α and β | 0.5 | 0.5 | 0.5 | 0.5 | 0.5 | 0.5 | 0.5 |
| Ratio (wα/wb) of distance wα between intersection point α and circumferential bent portion with respect to maximum width wb of land portion | 0.15 | 0.15 | 0.15 | 0.15 | 0.15 | 0.15 | 0.15 |
| Ratio (wβ/wb) of distance wβ between intersection point β and circumferential bent portion with respect to maximum width wb of land portion | 0.15 | 0.15 | 0.15 | 0.15 | 0.15 | 0.15 | 0.15 |
| Ratio (w1/wb) of width w1 from outermost side position to outer bent portion with respect to maximum width wb of land portion | 0.2 | 0.3 | 0.4 | 0.4 | 0.4 | 0.4 | 0.4 |
| Ratio (w2/wb) of width w2 from innermost side position to inner bent portion with respect to maximum width wb of land portion | 0.05 | 0.1 | 0.2 | 0.2 | 0.2 | 0.2 | 0.2 |
| Ratio (Lk/Lb) of distance Lk between outer bent portion and inner bent portion with respect to entire length Lb of land portion | 0.02 | 0.02 | 0.02 | 0.05 | 0.2 | 0.25 | 0.1 |
| Dry performance | 102 | 103 | 104 | 104 | 104 | 103 | 104 |
| Wet performance | 101 | 102 | 103 | 103 | 103 | 102 | 103 |
| Performance on ice and snow | 104 | 104 | 104 | 105 | 105 | 105 | 105 |

FIG. 5C

TIRE

TECHNICAL FIELD

The present technology relates to a tire.

BACKGROUND ART

Known tires include a tire having a devised shape of a groove formed in a tread portion to provide steering stability and performance on ice and snow as running performance on snowy roads and icy road surfaces, wet performance as running performance on wet road surfaces, or the like in a compatible manner. For example, in tires described in Japan Unexamined Patent Publication Nos. 2015-202818 A, 2018-172050A, 2018-043628A, 2018-012437 A and 2017-226368 A and in Japan Patent No. 5824124 B, a shape of a lug groove is devised, improving steering stability and running performance on icy and snowy road surfaces, wet performance, or the like.

Here, tires that require running performance during travel on road surfaces other than icy and snowy road surfaces, such as all-season tires with severe snow marking for light trucks, require not only performance on ice and snow but also dry performance as running performance on dry road surfaces and wet performance as running performance on wet road surfaces. Examples of a technique to enhance the performance on ice and snow include a technique of bending a lug groove extending in a tire width direction in a tire circumferential direction while extending the lug groove in the tire width direction. Bending the lug groove allows the volume of the lug groove to be increased, allowing more snow to enter the lug groove and increasing snow column shear force. Additionally, the edge length can be ensured, allowing the edge effect to be increased. Bending the lug groove as described above allows the performance on ice and snow to be increased. Unfortunately, even bending the lug groove simply has difficulty in improving dry performance and wet performance, and it is very difficult to satisfy all of the dry performance, the wet performance, and the performance on ice and snow.

SUMMARY

The present technology provides a tire that can satisfy dry performance, wet performance, and performance on ice and snow.

A tire according to an embodiment of the present technology includes a plurality of circumferential grooves extending in a tire circumferential direction, a plurality of lug grooves extending in a tire width direction, and a plurality of land portions each having both sides in the tire width direction defined by the circumferential grooves and both sides in the tire circumferential direction defined by the lug grooves. Width direction edge portions of the land portions that correspond to edge portions of the lug grooves extend in the tire width direction and include a plurality of width direction bent portions bent in the tire circumferential direction.

Of the plurality of width direction bent portions of one of the width direction edge portions, the width direction bent portion that is disposed on an outer side in the tire width direction with respect to a land portion center line passing through a center of the land portions in the tire width direction and is closest to the land portion center line is an outer bent portion, of the plurality of width direction bent portions of the one of the width direction edge portions, the width direction bent portion that is disposed on an inner side in the tire width direction with respect to the land portion center line and is closest to the land portion center line is an inner bent portion, the width direction edge portions include a portion between the outer bent portion and the inner bent portion linearly formed, the land portions have a width w1 in the tire width direction from the outermost side position to the outer bent portion of the land portions in the tire width direction and a width w2 in the tire width direction from the innermost side position to the inner bent portion of the land portions in the tire width direction, the width w1 and the width w2 have a relationship satisfying $w2<w1$, and a maximum width wb of the land portions in the tire width direction, and a width wc between the outer bent portion and the inner bent portion in the tire width direction have a relationship in a range $0.2 \le (wc/wb) \le 0.6$.

In the tire described above, of circumferential edge portions that correspond to edge portions of the circumferential grooves and are located on both the sides of the land portions in the tire width direction, an outer side circumferential edge portion that is the circumferential edge portion on the outer side in the tire width direction is preferably formed in a straight shape extending in the tire circumferential direction.

In the tire described above, of the circumferential edge portions that correspond to edge portions of the circumferential grooves and are located on both the sides of the land portions in the tire width direction, an inner side circumferential edge portion that is the circumferential edge portion on the inner side in the tire width direction preferably includes a circumferential bent portion that is bent projecting toward the inner side in the tire width direction.

In the tire described above, of the width direction edge portions located on both the sides of the land portions in the tire circumferential direction, an intersection point between one of the width direction edge portions and the inner side circumferential edge portion is an intersection point $\alpha$, an intersection point between the other of the width direction edge portions and the inner side circumferential edge portion is an intersection point $\beta$, and a distance Lh between the intersection points $\alpha$ and $\beta$ in the tire circumferential direction and a distance L3 between the intersection point $\alpha$ and the circumferential bent portion in the tire circumferential direction preferably have a relationship in a range $0.4 \le (L3/Lh) \le 0.6$.

In the tire described above, a distance $w\alpha$ between the intersection point $\alpha$ and the circumferential bent portion in the tire width direction and the maximum width wb of the land portions in the tire width direction preferably have a relationship in a range $0.1 \le (w\alpha/wb)$, and a distance $w\beta$ between the intersection point $\beta$ and the circumferential bent portion in the tire width direction and the maximum width wb of the land portions in the tire width direction preferably have a relationship in a range $0.1 \le (w\beta/wb) \le 0.2$.

In the tire described above, a width w1 in the tire width direction from the outermost side position to the outer bent portion and the maximum width wb of the land portions in the tire width direction preferably have a relationship satisfying $(w1/wb) \ge 0.3$, and a width w2 from the innermost side position to the inner bent portion in the tire width direction and the maximum width wb of the land portions in the tire width direction preferably have a relationship satisfying $(w2/wb) \ge 0.1$.

In the tire described above, a distance Lk between the outer bent portion and the inner bent portion in the tire circumferential direction and an entire length Lb of the land portions in the tire circumferential direction preferably have a relationship in a range $0.05 \leq (Lk/Lb) \leq 0.2$.

The tire according to an embodiment of the present technology achieves the effect that can satisfy dry performance, wet performance, and performance on ice and snow.

BRIEF DESCRIPTION OF DRAWINGS

FIG. 5A is a table showing results of performance evaluation tests of pneumatic tires.

FIG. 5B is a table showing results of performance evaluation tests of pneumatic tires.

FIG. 5C is a table showing results of performance evaluation tests of pneumatic tires.

DETAILED DESCRIPTION

Tires according to embodiments of the present technology will be described in detail below with reference to the drawings. However, the present technology is not limited to the embodiment. Constituents of the following embodiments include elements that can be substituted and easily conceived of by a person skilled in the art or that are essentially identical.

Embodiments

In the following description, a description will be given using a pneumatic tire 1 as an example of the tire according to the embodiments of the present technology. The pneumatic tire 1 as an example of the tire can be inflated with any gas including air and inert gas, such as nitrogen.

Additionally, hereinafter, the term "tire radial direction" refers to a direction orthogonal to a tire rotation axis (not illustrated) that is a rotation axis of the pneumatic tire 1, the term "inner side in a tire radial direction" refers to a side toward the tire rotation axis in the tire radial direction, and the term "outer side in the tire radial direction" refers to a side away from the tire rotation axis in the tire radial direction. The term "tire circumferential direction" refers to a circumferential direction with the tire rotation axis as a center axis. Additionally, the term "tire width direction" refers to a direction parallel with the tire rotation axis, the term "inner side in the tire width direction" refers to a side toward a tire equatorial plane (tire equatorial line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1.

The tire equatorial plane CL aligns, in a position in the tire width direction, with a center line in the tire width direction corresponding to a center position of the pneumatic tire 1 in the tire width direction. The tire width is the width in the tire width direction between portions located on the outermost sides in the tire width direction, or in other words, the distance between the portions that are the most distant from the tire equatorial plane CL in the tire width direction. "Tire equator line" refers to a line in the tire circumferential direction of the pneumatic tire 1 that lies on the tire equatorial plane CL. In the description below, "tire meridian section" refers to a cross-section of the tire taken along a plane that includes the tire rotation axis.

Figure 1:
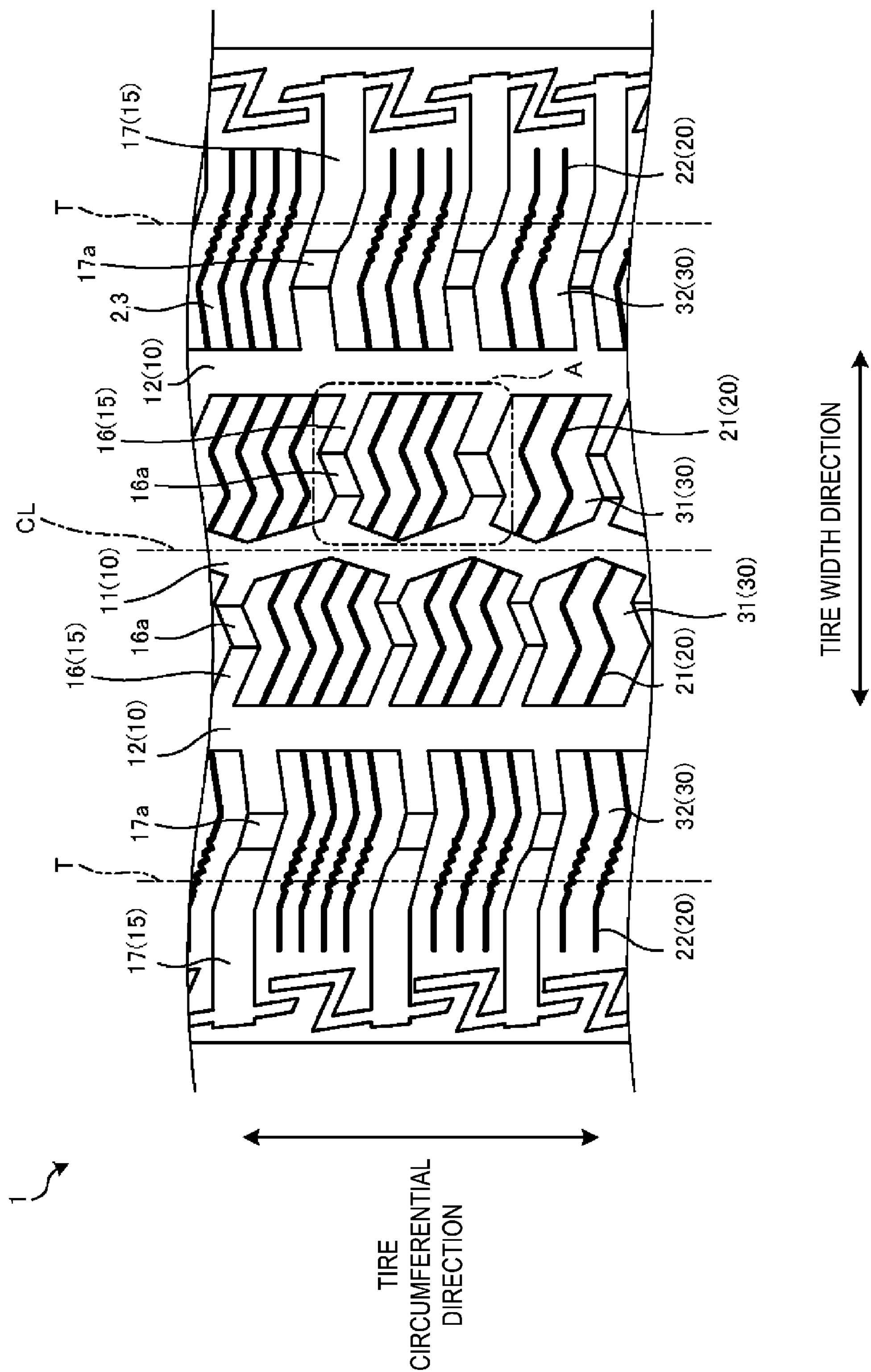
FIG. 1 is a plan view illustrating a road contact surface of a tread portion of a pneumatic tire according to an embodiment.

FIG. 1 is a plan view of a road contact surface 3 of a tread portion 2 of the pneumatic tire 1 according to an embodiment. The pneumatic tire 1 illustrated in FIG. 1 includes the tread portion 2 disposed at the outermost portion of the pneumatic tire 1 in the tire radial direction. The surface of the tread portion 2, in other words, a portion that comes into contact with a road surface when a vehicle (not illustrated) equipped with the pneumatic tire 1 travels is formed as the road contact surface 3. A plurality of grooves are formed in the road contact surface 3 on each of both sides in the tire width direction between which the tire equatorial plane CL is disposed as the center. A plurality of land portions 30 are defined by the plurality of grooves. The grooves include a plurality of circumferential grooves 10 extending in the tire circumferential direction and a plurality of lug grooves 15 extending in the tire width direction. The land portions 30 defined by the plurality of grooves are defined by the plurality of circumferential grooves 10 and the plurality of lug grooves 15.

In the present embodiment, three circumferential grooves 10 are disposed side by side in the tire width direction. Of the three circumferential grooves 10, one circumferential groove is disposed on the tire equatorial plane CL and each one of the remaining two circumferential grooves is disposed on either side of the tire equatorial plane CL in the tire width direction. Of the three circumferential grooves 10 aligned in the tire width direction, the circumferential groove 10 located at the center in the tire width direction is provided as a center circumferential groove 11, and the circumferential grooves 10 located on both sides of the center circumferential groove 11 in the tire width direction are provided as outermost circumferential grooves 12. In other words, of the plurality of circumferential grooves 10, the outermost circumferential grooves 12 are the circumferential grooves 10 located on the outermost side in the tire width direction respectively on both sides of the tire equatorial plane CL in the tire width direction.

Of the plurality of circumferential grooves 10, the center circumferential groove 11 is formed to be repeatedly bent in the tire width direction while extending in the tire circumferential direction. In other words, the center circumferential groove 11 waves in the tire width direction while extending in the tire circumferential direction and thus is formed in a zigzag shape. Also, the outermost circumferential groove 12 is formed to extend linearly in the tire circumferential direction. The circumferential grooves 10 formed as just described each have a groove width within a range of 8.0 mm or more and 20.0 mm or less and a groove depth within a range of 7.0 mm or more and 15.0 mm or less.

Additionally, of the plurality of land portions 30, the land portion 30 disposed on an inner side of the outermost circumferential groove 12 in the tire width direction is a center land portion 31, and the land portion 30 disposed on an outer side of the outermost circumferential groove 12 in the tire width direction is a shoulder land portion 32. In the present embodiment, one center circumferential groove 11 is disposed on the tire equatorial plane CL between the two outermost circumferential grooves 12 located on both the sides of the tire equatorial plane CL in the tire width direction, and thus two center land portions 31 each located on the inner side of the outermost circumferential groove 12 in the tire width direction are disposed on both sides of the center circumferential groove 11 in the tire width direction. In other words, the two center land portions 31 each located on the inner side of the outermost circumferential groove 12 in the tire width direction have the inner side in the tire width direction defined by the center circumferential groove 11 and the outer side in the tire circumferential direction defined by the outermost circumferential groove 12. Also, the two shoulder land portions 32 disposed on the respective outer side of the two outermost circumferential grooves 12 in the tire width direction have the inner side in the tire width direction defined by the outermost circumferential groove 12.

The lug grooves 15 have a groove width within a range of 5.0 mm or more and 15.0 mm or less and a groove depth within a range of 7.0 mm or more and 15.0 mm or less. The lug grooves 15 are disposed on an inner side in the tire width direction and an outer side of the outermost circumferential groove 12 in the tire width direction, and of the plurality of lug grooves 15, the lug grooves 15 located on the inner side of the outermost circumferential groove 12 in the tire width direction are center lug grooves 16. The center lug grooves 16 are disposed side by side in the tire circumferential direction on each of both the sides of the center circumferential groove 11 in the tire width direction. The center lug grooves 16 located on both the sides of the center circumferential groove 11 in the tire width direction are each opened at an inner end portion in the tire width direction to the center circumferential groove 11 and opened at an outer end portion in the tire width direction to the outermost circumferential groove 12. Additionally, the center lug grooves 16 located on both the sides of the center circumferential groove 11 in the tire width direction are disposed at different positions in the tire circumferential direction.

The center lug groove 16 is bent multiple times in the tire circumferential direction while extending in the tire width direction. In other words, the center lug groove 16 has a plurality of bent portions. In the present embodiment, each of the center lug grooves 16 is bent twice in the tire circumferential direction while extending in the tire width direction, and thus, each center lug groove 16 includes two bent portions.

Additionally, a raised bottom portion **16*a* is formed in a groove bottom of the center lug groove 16 at a position between the end portion on the center circumferential groove 11 side and the end portion on the outermost circumferential groove 12 side. The raised bottom portion 16*a* is disposed in a portion between the two bent portions of the center lug groove 16. Both ends of the center lug groove 16 open to the circumferential grooves 10, and thus the center land portions 31 are each formed as the so-called block-shaped land portion 30 with both sides in the tire width direction defined by the circumferential grooves 10 and both sides in the tire circumferential direction defined by the lug grooves 15**.

Moreover, of the plurality of lug grooves 15, the lug grooves 15 located on the outer side of the outermost circumferential groove 12 in the tire width direction are shoulder lug grooves 17. A plurality of the shoulder lug grooves 17 are disposed side by side in the tire circumferential direction in each of the two shoulder land portions 32, and each of the shoulder lug grooves 17 is opened at an inner end portion in the tire width direction to the outermost circumferential groove 12. Further, the shoulder lug groove 17 is formed across a ground contact edge T in the tire width direction. Accordingly, the shoulder lug groove 17 is disposed from the position of the outermost circumferential groove 12 located on an inner side of the ground contact edge T in the tire width direction to an outer side of the ground contact edge Tin the tire width direction. Furthermore, the shoulder lug groove 17 is bent multiple times in the tire circumferential direction while extending in the tire width direction, and a raised bottom portion **17*a* is formed in a groove bottom of the shoulder lug groove 17** at a position further on an inner side in the tire width direction than the ground contact edge T.

Note that the ground contact edges T here refer to both outermost ends in the tire width direction of a region that comes into contact with a flat plate on the road contact surface 3 when the pneumatic tire 1 is mounted on a specified rim, inflated to a specified internal pressure, placed perpendicular to the flat plate in a stationary state, and loaded with a load corresponding to a specified load, and the ground contact edges T are continuous in the tire circumferential direction. Here, "regular rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Moreover, a regular internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Further, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

Additionally, a plurality of sipes 20 are formed on the road contact surface 3, and the sipes 20 are disposed in each of the land portions 30 including the center land portion 31 and the shoulder land portion 32. In other words, center sipes 21 are disposed in the center land portion 31, and shoulder sipes 22 are disposed in the shoulder land portion 32. The sipes 20 described herein are each formed in a narrow groove shape on the ground contact surface 3. When the pneumatic tire 1 is mounted on a regular rim, inflated to a regular internal pressure, and placed in an unloaded state under internal pressure conditions of a regular internal pressure, wall surfaces constituting the narrow groove do not contact one another. Meanwhile, in a case where the narrow groove is located in a portion of the ground contact surface, which is formed on a flat plate when a load is vertically applied on the flat plate, or in a case where the land portion 30 in which the narrow grooves are formed falls down, the wall surfaces constituting the narrow groove or at least portions disposed on the wall surfaces are brought into contact with one another by deformation of the land portion 30. In the present embodiment, the sipes 20 have a sipe width of below 1 mm, which is an interval between the wall surfaces constituting the narrow groove, and a sipe depth within a range of 4.0 mm or more and 12.0 mm or less.

The center sipes 21 that are the sipes 20 disposed in the center land portion 31 are formed extending in the tire width direction, and both ends of the center sipes 21 open to the circumferential grooves 10. In other words, the center sipes 21 have an inner end portion in the tire width direction opening to the center circumferential groove 11 and an outer end portion in the tire width direction opening to the outermost circumferential groove 12. The center sipes 21 are formed substantially parallel to the center lug groove 16. Accordingly, similar to the center lug groove 16, the center sipes 21 are bent twice in the tire circumferential direction while extending in the tire width direction.

The center sipes 21 are formed as just described, and the number of center sipes 21 to be disposed between the adjacent center lug grooves 16 differs by the size of a pitch between the center lug grooves 16 adjacent in the tire circumferential direction. In other words, the center lug groove 16 has a plurality of pitches having different sizes in one circle in the tire circumferential direction, as an interval between the center lug grooves 16 adjacent in the tire circumferential direction, that is, a pitch in the tire circumferential direction. Accordingly, the center lug grooves 16 adjacent in the tire circumferential direction have pitches that are not all equal in one circle in the tire circumferential direction and include portions disposed at different pitches. The center sipes 21 disposed between the center lug grooves 16 adjacent in the tire circumferential direction have the larger number of center sipes in a portion with a relatively large pitch and the smaller number of center sipes in a portion with a relatively small pitch of portions between the center lug grooves 16 disposed adjacent in the tire circumferential direction at such different pitches.

The shoulder sipes 22 that are the sipes 20 disposed in the shoulder land portion 32 are formed extending in the tire width direction, and inner end portions of the shoulder sipes 22 in the tire width direction open to the outermost circumferential groove 12 and extend from the position of the outermost circumferential groove 12 toward the outer side in the tire width direction. The shoulder sipes 22 extend in the tire width direction and thus are formed across the ground contact edge Tin the tire width direction, and end portions of the shoulder sipes 22 on the opposite side of the end portions opening to the outermost circumferential groove 12 terminate within the shoulder land portion 32. Furthermore, the shoulder sipes 22 wave multiple times in the tire circumferential direction while extending in the tire width direction in a partial area between the end portions on both sides in the extension direction.

Similar to the center sipes 21 disposed in the center land portion 31, the number of the shoulder sipes 22 to be disposed differs depending on the size of a pitch between the adjacent shoulder lug grooves 17. In other words, similar to the center lug groove 16, the shoulder lug grooves 17 adjacent to each other in the tire circumferential direction are disposed at a plurality of pitches having different sizes. The shoulder sipes 22 disposed between the shoulder lug grooves 17 adjacent in the tire circumferential direction have the larger number of shoulder sipes in a portion with a relatively large pitch and the smaller number of shoulder sipes in a portion with a relatively small pitch of portions between the shoulder lug grooves 17 disposed adjacent in the tire circumferential direction at such different pitches.

Figure 2:
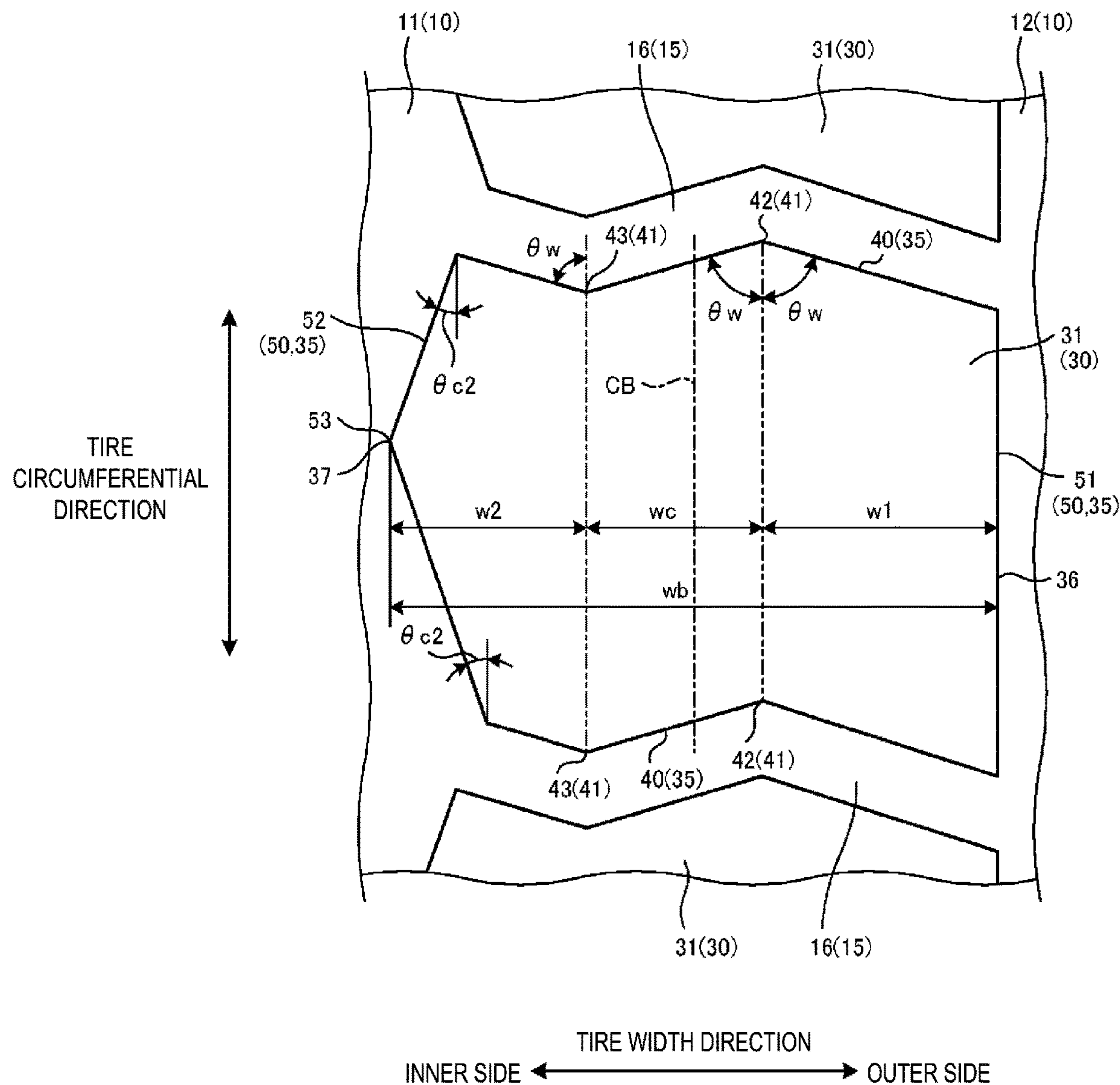
FIG. 2 is a detailed view of a portion A of FIG. 1.
Figure 3:
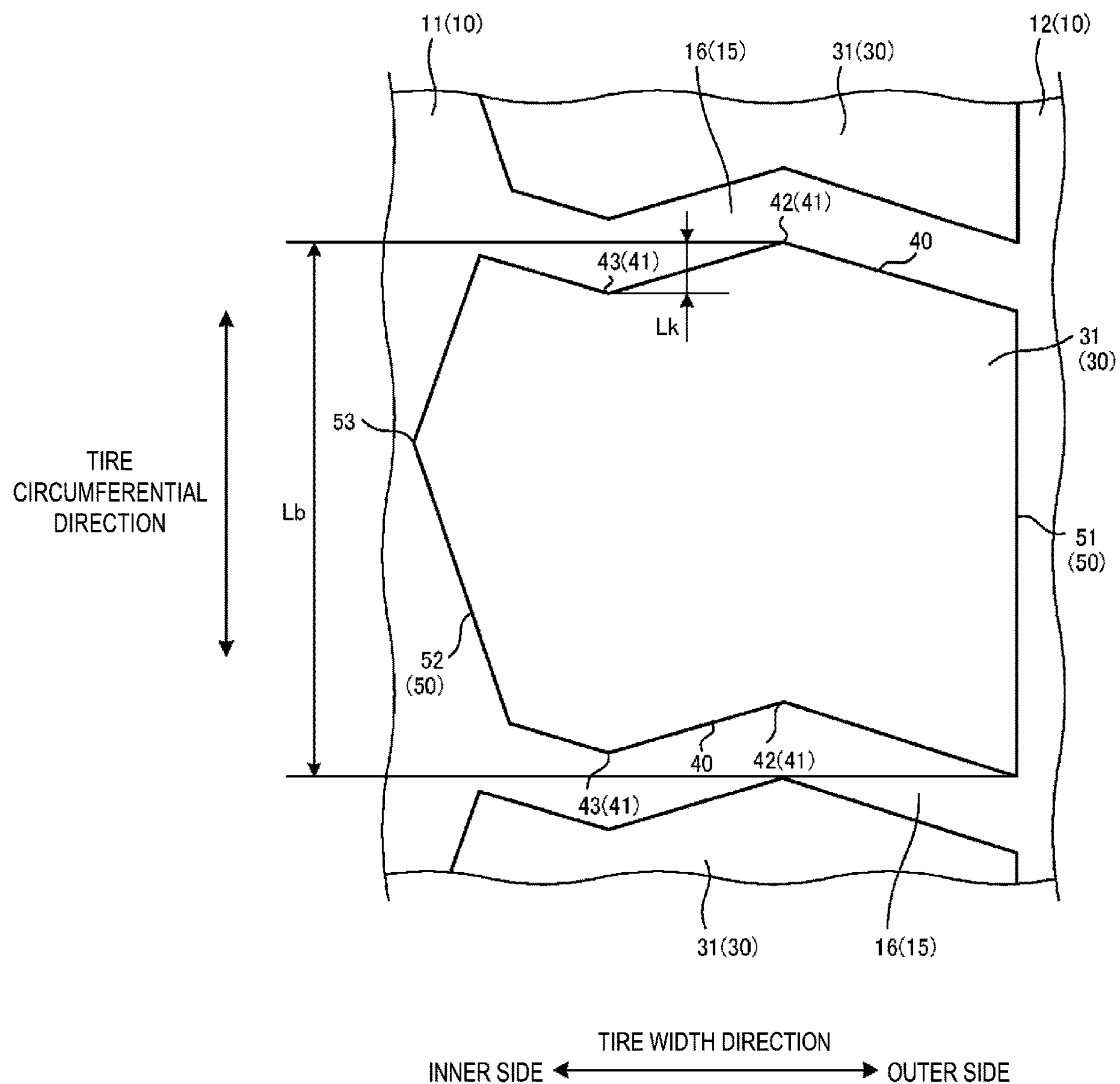
FIG. 3 is detailed view of part A of FIG. 1 and is an explanatory diagram of the size of amplitude of a width direction edge portion in a tire circumferential direction.
Figure 4:
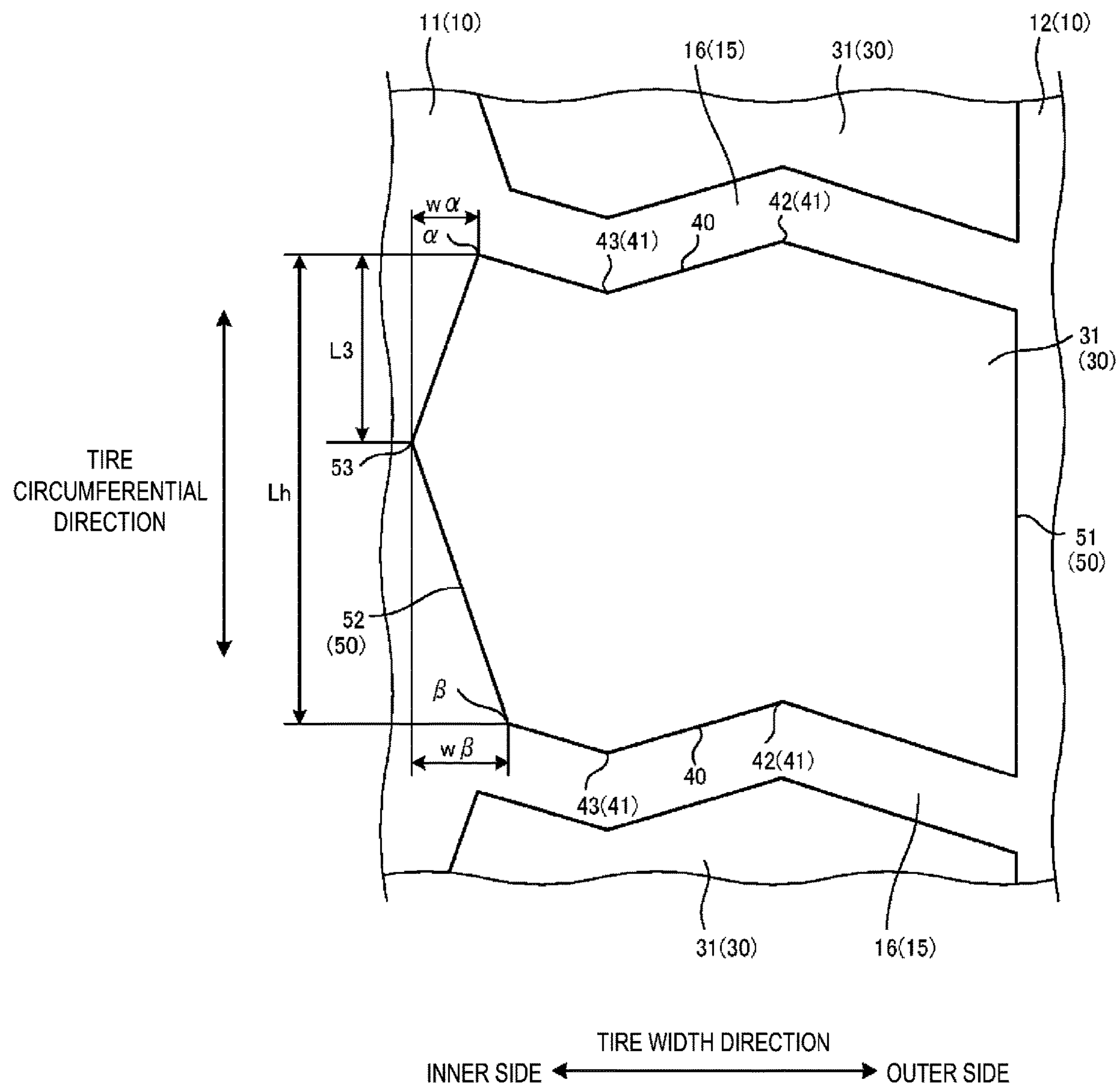
FIG. 4 is a detailed view of part A of FIG. 1 and is an explanatory diagram of the shape of an inner side circumferential edge portion.

FIG. 2 is a detailed view of the portion A of FIG. 1. Note that FIGS. 2 to 4 are explanatory diagrams for illustrating the shape of the center land portion 31 and the raised bottom portions 16*a* of the center lug grooves 16 and the sipes 20 are omitted from the drawings for easy recognition of the shape of the center land portion 31. The center lug grooves 16 that are the lug grooves 15 defining both the sides of the center land portion 31 in the tire circumferential direction are bent multiple times in the tire circumferential direction while extending in the tire width direction, and width direction edge portions 40 of the center land portion 31 that correspond to edge portions 35 of the lug grooves 15 are also bent multiple times in the tire circumferential direction while extending in the tire width direction. In other words, the width direction edge portions 40 located on both the sides of the center land portion 31 in the tire circumferential direction each extend in the tire width direction and include a plurality of width direction bent portions 41 bent in the tire circumferential direction.

In the present embodiment, since the center lug groove 16 is bent twice in the tire circumferential direction while extending in the tire width direction, the width direction edge portions 40 located on both the sides of the center land portion 31 in the tire circumferential direction also each include the width direction bent portions 41 at two locations while extending in the tire width direction. In other words, the width direction edge portion 40 includes the width direction bent portions 41 bent in the tire circumferential direction, and thus the center lug groove 16 is also bent in the tire circumferential direction while extending in the tire width direction.

Of the width direction bent portions 41 at two locations included in the width direction edge portion 40, the width direction bent portion 41 located on an outer side in the tire width direction is an outer bent portion 42, and the width direction bent portion 41 located on an inner side in the tire width direction is an inner bent portion 43. Specifically, the outer bent portion 42 of a plurality of the width direction bent portions 41 included in the single width direction edge portion 40 is the width direction bent portion 41 that is disposed on the outer side in the tire width direction with respect to a land portion center line CB passing the center of the land portion 30 in the tire width direction and is closest to the land portion center line CB. Also, the inner bent portion 43 of the plurality of width direction bent portions 41 included in the single width direction edge portion 40 is the width direction bent portion 41 that is disposed on the inner side in the tire width direction with respect to the land portion center line CB and is closest to the land portion center line CB.

The outer bent portion 42 and the inner bent portion 43 of one of the width direction edge portions 40 have bent directions opposite to each other in the tire circumferential direction. In other words, the outer bent portion 42 is bent projecting toward one direction of the tire circumferential direction, and the inner bent portion 43 is bent projecting toward the other direction of the tire circumferential direction. The width direction edge portions 40 located on both the sides of the center land portion 31 in the tire circumferential direction have the same bent direction of the outer bent portion 42 in the tire circumferential direction and the same bent direction of the inner bent portion 43 in the tire circumferential direction.

The width direction edge portions 40 include a portion between the outer bent portion 42 and the inner bent portion 43 linearly formed. In addition, the width direction edge portions 40 also include a portion from the outer bent portion 42 to an end portion on the outermost circumferential groove 12 side of the width direction edge portion 40 linearly formed and a portion from the inner bent portion 43 to an end portion on the center circumferential groove 11 side of the width direction edge portion 40 linearly formed. The width direction edge portions 40 bent in the tire circumferential direction while extending in the tire width direction as described above have an inclination angle Ow in the tire width direction with respect to the tire circumferential direction in a range of 60° or more and 90° or less in any position.

Further, the center circumferential groove 11 that is the circumferential groove 10 defining the inner side of the center land portion 31 in the tire width direction is repeatedly bent in the tire width direction while extending in the tire circumferential direction, and thus an inner side circumferential edge portion 52 that is the edge portion 35 of the center circumferential groove 11 in the center land portion 31 is also bent in the tire width direction while extending in the tire circumferential direction. In this case, the inner side circumferential edge portion 52 is the edge portion 35 of the circumferential groove 10 in the center land portion 31. Of circumferential edge portions 50 located on both the sides of the center land portion 31 in the tire width direction, the inner side circumferential edge portion 52 is the circumferential edge portion 50 on the inner side in the tire width direction. The inner side circumferential edge portion 52 is formed to be bent in the tire width direction while extending in the tire circumferential direction, and thus includes a circumferential bent portion 53 that is bent while projecting toward an inner side in the tire width direction. In other words, the inner side circumferential edge portion 52 is bent once projecting toward the inner side in the tire width direction at the circumferential bent portion 53 while extending in the tire circumferential direction. The inner side circumferential edge portion 52 bent in the tire width direction while extending in the tire circumferential direction has an inclination angle $\theta c2$ in the tire width direction with respect to the tire circumferential direction in a range of 10° or more and 40° or less in any position.

Furthermore, the outermost circumferential groove 12 that is the circumferential groove 10 defining the outer side of the center land portion 31 in the tire width direction is formed extending linearly in the tire circumferential direction, and thus an outer side circumferential edge portion 51 that is the edge portion 35 of the outermost circumferential groove 12 in the center land portion 31 is also formed in a straight shape extending in the tire circumferential direction. In this case, the outer side circumferential edge portion 51 is the edge portion 35 of the circumferential groove 10 in the center land portion 31. Of the circumferential edge portions 50 located on both the sides of the center land portion 31 in the tire width direction, the outer side circumferential edge portion 51 is the circumferential edge portions 50 on the outer side in the tire width direction. The outer side circumferential edge portion 51 extending in a straight shape in the tire circumferential direction has an inclination angle $\theta c1$ (not illustrated because of $\theta c1=0°$ in the embodiment) in the tire width direction with respect to the tire circumferential direction in a range of 0° or more and 10° or less in any position.

Additionally, in the center land portion 31, a width w1 in the tire width direction from the outermost side position 36 of the center land portion 31 in the tire width direction to the outer bent portion 42 and a width w2 in the tire width direction from the innermost side position 37 in the tire width direction to the inner bent portion 43 of the center land portion 31 have the relationship satisfying $w2<w1$. In other words, in the center land portion 31, the width w1 in the tire width direction from the outermost side position 36 in the tire width direction to the outer bent portion 42 is greater than the width w2 in the tire width direction from the innermost side position 37 in the tire width direction to the inner bent portion 43.

In this case, the outermost side position 36 is the position of the outer side circumferential edge portion 51 in the tire width direction extending linearly in the tire circumferential direction. Also, the innermost side position 37 is the position of the circumferential bent portion 53 in the tire width direction that is a portion of the inner side circumferential edge portion 52, which is bent protruding toward the inner side in the tire width direction.

Note that the width w1 from the outermost side position 36 to the outer bent portion 42 of the center land portion 31 and the width w2 from the innermost side position 37 to the inner bent portion 43 preferably satisfy the relationship $(w1/w2)\leq 5$. In other words, in the center land portion 31, the width w1 from the outermost side position 36 to the outer bent portion 42 and the width w2 from the innermost side position 37 to the inner bent portion 43 preferably satisfy the relationship $1<(w1/w2)\leq 5$.

Further, in the center land portion 31, the width w1 in the tire width direction from the outermost side position 36 to the outer bent portion 42 and a maximum width wb of the center land portion 31 in the tire width direction have the relationship satisfying $(w1/wb)\geq 0.3$. Furthermore, in the center land portion 31, the width w2 in the tire width direction from the innermost side position 37 to the inner bent portion 43 and the maximum width wb of the center land portion 31 in the tire width direction have the relationship satisfying $(w2/wb)\geq 0.1$. In this case, the maximum width wb of the center land portion 31 in the tire width direction is a distance in the tire width direction between the outermost side position 36 of the center land portion 31 in the tire width direction and the innermost side position 37 of the center land portion 31 in the tire width direction.

Moreover, in the center land portion 31, the relationship between the maximum width wb of the center land portion 31 in the tire width direction and a width wc in the tire width direction between the outer bent portion 42 and the inner bent portion 43 is in the range $0.2\leq(wc/wb)\leq 0.6$.

FIG. 3 is detailed view of part A of FIG. 1 and is an explanatory diagram of the size of amplitude of the width direction edge portion 40 in the tire circumferential direction. In the center land portion 31, any of the width direction edge portions 40 located on both the sides of the center land portion 31 in the tire circumferential direction has a relationship between a distance Lk in the tire circumferential direction between the outer bent portion 42 and the inner bent portion 43, and an entire length Lb of the center land portion 31 in the tire circumferential direction, which is in the range $0.05\leq(Lk/Lb)\leq 0.2$. In this case, the entire length Lb of the center land portion 31 in the tire circumferential direction is a distance in the tire circumferential direction between points that are most separated of points forming the center land portion 31 in the tire circumferential direction. In other words, the entire length Lb of the center land portion 31 in the tire circumferential direction is a distance in the tire circumferential direction between a portion of the center land portion 31, which is located on one outermost side in the tire circumferential direction and a portion of the center land portion 31, which is located on the other outermost side in the tire circumferential direction.

FIG. 4 is a detailed view of part A of FIG. 1 and is an explanatory diagram of the shape of the inner side circumferential edge portion 52. In the center land portion 31, when an intersection point between the inner side circumferential edge portion 52 and one of the width direction edge portions 40 is $\alpha$ and an intersection point between the inner side circumferential edge portion 52 and the other of the width direction edge portions 40 is $\beta$, the relationship between a distance LH in the tire circumferential direction between the intersection points $\alpha$ and $\beta$, and a distance L3 in the tire circumferential direction between the intersection point $\alpha$ and the circumferential bent portion 53 is in the range $0.4\leq(L3/Lh)\leq 0.6$. In this case, the intersection point $\alpha$ is an intersection point between one width direction edge portion 40 of the width direction edge portions 40 located on both the sides of the center land portion 31 in the tire circumferential direction and the inner side circumferential edge portion 52, and the intersection point β is an intersection point between the other width direction edge portion 40 and the inner side circumferential edge portion 52.

Further, the inner side circumferential edge portion 52 of the center land portion 31 has a relationship, which is in the range $0.1 \le (w\alpha/wb) \le 0.2$, between a distance wα in the tire width direction between the intersection point α and the circumferential bent portion 53, and the maximum width wb of the center land portion 31 in the tire width direction. Further, likewise, the inner side circumferential edge portion 52 has a relationship, which is in the range $0.1 \le (w\beta/wb) \le 0.2$, between a distance wβ in the tire width direction between the intersection point β and the circumferential bent portion 53, and the maximum width wb of the center land portion 31 in the tire width direction.

The pneumatic tire 1 according to the present embodiment is, for example, a pneumatic tire 1 for a light truck, which is mounted on a light truck. In the event of mounting the pneumatic tire 1 on a vehicle, the pneumatic tire 1 is assembled on a rim wheel and mounted on the vehicle in an inflated state where the inside is filled with air. When the vehicle on which the pneumatic tires 1 are mounted travels, the pneumatic tires 1 each rotate while of the road contact surface 3 on the tread portion 2, the road contact surface 3 located at the bottom comes into contact with the road surface. When traveling on dry road surfaces, the vehicle on which the pneumatic tires 1 are mounted travels by, mainly with friction force between the road contact surface 3 and the road surfaces, transmitting driving force and braking force to the road surfaces and generating turning force. Additionally, during traveling on wet road surfaces, water between the road contact surface 3 and the road surfaces enters grooves such as the circumferential grooves 10 and the lug grooves 15 and the sipes 20, and the vehicle travels while the water between the road contact surface 3 and the road surfaces is drained through the grooves. This allows the ground contact surface 3 to easily contact the road surfaces, allowing the vehicle to travel with friction force between the road contact surface 3 and the road surfaces.

Additionally, during traveling on snow-covered road surfaces or icy road surfaces, the vehicle travels with the use of the edge effect of the circumferential grooves 10, the lug grooves 15, and the sipes 20. In other words, during traveling on snow-covered road surfaces or icy road surfaces, the vehicle travels with the use of resistance caused when the edges of circumferential grooves 10, the edges of the lug grooves 15, and the edges of the sipes 20 are caught on the snow surface or the icy surface. Further, during traveling on icy road surfaces, water on the icy road surface is absorbed by the sipes 20 to remove the water film between the icy road surface and the ground contact surface 3, and thus the ground contact surface 3 easily comes into contact with the icy road surface. This increases the resistance between the ground contact surface 3 and the icy road surface due to the frictional force and the edge effect, allowing running performance of the vehicle on which the pneumatic tires 1 are mounted to be ensured.

Furthermore, during traveling on snow-covered road surfaces, the pneumatic tire 1 presses and compacts snow on the road surface with the road contact surface 3, and the snow on the road surface enters the lug grooves 15 to be pressed and compacted into the grooves. When driving force or braking force acts on the pneumatic tire 1 in this state, a shear force acting on the snow in the grooves, which is a so-called snow column shear force, is generated between the pneumatic tire 1 and the snow. During traveling on snow-covered road surfaces, resistance is generated between the pneumatic tire 1 and the road surface by the snow column shear force, allowing driving force and braking force to be transmitted to the road surface and snow traction properties to be ensured. This allows the vehicle to ensure running performance on snow-covered road surfaces.

In the pneumatic tire 1 according to the present embodiment, the width direction edge portion 40 of the center land portion 31 further includes the plurality of width direction bent portions 41 bent in the tire circumferential direction. Thus, the width direction edge portion 40 includes the plurality of width direction bent portions 41, and the length of the edge increases, causing the edge effect to be easily exerted and the edge effect to be easily exerted by the width direction bent portions 41 formed bent. This allows running performance on icy road surfaces to be improved. Additionally, since the width direction edge portion 40 is bent, the length of the lug groove 15, the edge of which is formed by the width direction edge portion 40 with respect to the road contact surface 3 is increased, and thus the volume of water or snow that can enter the lug grooves 15 can be increased. This allows drainage properties to be improved or snow column shear force to be improved, allowing running performance on wet road surfaces and running performance on snow-covered road surfaces to be improved.

Securing running performance on icy and snowy road surfaces and wet road surfaces is largely affected by the lug grooves 15 as just described, and it is an effective approach to increase the groove area of the lug grooves 15. Meanwhile, increasing the groove area decreases the rigidity of the land portion 30. When the rigidity of the land portion 30 is decreased, the land portion 30 is easily deformed by a large load when the load acts on the land portion 30 due to, for example, cornering or lane changing during travel on dry road surfaces, and running stability may be easily decreased.

In contrast, in the pneumatic tire 1 according to the present embodiment, the width direction edge portion 40 of the center land portion 31 has the width w1 in the tire width direction from the outermost side position 36 located on the outer side in the tire width direction from the land portion center line CB to the outer bent portion 42 and the width w2 in the tire width direction from the innermost side position 37 located on the inner side in the tire width direction from the land portion center line CB to the inner bent portion 43 have a relationship satisfying $w2 < w1$. As a result, even in a case where the width direction edge portion 40 of the center land portion 31 includes the plurality of width direction bent portions 41, the center land portion 31 can ensure rigidity at a position closer to the outer side from the land portion center line CB in the tire width direction. At the time of cornering and lane changing, a large load easily acts on a position closer to the outer side of the land portion 30 in the tire width direction, and rigidity of a position of the center land portion 31 closer to the outer side in the tire width direction is increased, allowing deformation of the center land portion 31 due to the load applied to the center land portion 31 during cornering or lane changing to be suppressed. Consequently, during traveling on dry road surfaces, a reduction in stability, which is caused by deformation of the land portion 30 due to the load can be suppressed, and running stability can be ensured. As a result, dry performance, wet performance, and performance on ice and snow can be satisfied.

Further, the relationship between the maximum width wb of the center land portion 31 in the tire width direction and the width wc in the tire width direction between the outer bent portion 42 and the inner bent portion 43 is in the range $0.2 \leq (wc/wb) \leq 0.6$, and thus, when a large load acts on the center land portion 31, deformation of the center land portion 31 can be more reliably suppressed. In other words, in a case where the relationship between the maximum width wb of the center land portion 31 in the tire width direction and the width wc in the tire width direction between the outer bent portion 42 and the inner bent portion 43 is $(wc/wb) < 0.2$, the width wc in the tire width direction between the outer bent portion 42 and the inner bent portion 43 is too small. Thus, the distance in the tire width direction between the outer bent portion 42 and the inner bent portion 43 may be too close. In this case, the rigidity of a portion between the outer bent portion 42 and the inner bent portion 43 in the center land portion 31 is too low. Accordingly, when a large load acts on the center land portion 31, it may be difficult to suppress deformation of the center land portion 31. Furthermore, in a case where the relationship between the maximum width wb of the center land portion 31 in the tire width direction and the width wc in the tire width direction between the outer bent portion 42 and the inner bent portion 43 is $(wc/wb) > 0.6$, the width wc in the tire width direction between the outer bent portion 42 and the inner bent portion 43 is too large. Thus, it may be difficult to ensure the width w1 in the tire width direction from the outermost side position 36 to the outer bent portion 42 of the center land portion 31. In this case, it is difficult to ensure rigidity of a position of the center land portion 31, which is closer to the outer side in the tire width direction. Thus, when a large load acts on the position of the center land portion 31, which is closer to the outer side in the tire width direction, at the time of cornering and lane changing, it may be difficult to suppress deformation of the center land portion 31.

In contrast, in a case where the relationship between the maximum width wb of the center land portion 31 in the tire width direction and the width wc in the tire width direction between the outer bent portion 42 and the inner bent portion 43 is in the range $0.2 \leq (wc/wb) \leq 0.6$, the rigidity of a portion between the outer bent portion 42 and the inner bent portion 43 of the center land portion 31 can be prevented from being too low, and the rigidity of a position of the center land portion 31, which is closer to the outer side in the tire width direction can be prevented from being too low. This allows deformation of the center land portion 31 when a large load acts on the center land portion 31 to be more reliably suppressed and running stability on dry road surfaces to be ensured. As a result, dry performance, wet performance, and performance on ice and snow can be more reliably satisfied.

Additionally, since the center land portion 31 includes the outer side circumferential edge portion 51 formed in a straight shape, the circumferential groove 10 defining the outer side of the center land portion 31 in the tire width direction can be formed in a straight shape. This allows the ease of the flow of water flowing in the circumferential groove 10 to be ensured and drainage properties of the circumferential groove 10 to be enhanced, allowing running performance on wet road surfaces to be enhanced. As a result, wet performance can be more reliably improved.

Further, the center land portion 31 includes the inner side circumferential edge portion 52 that is provided with the circumferential bent portion 53 bent projecting toward the inner side in the tire width direction. Thus, the edge components of the inner side circumferential edge portion 52 can be increased, and running performance on icy road surfaces can be improved. Furthermore, the inner side circumferential edge portion 52 is bent, and thus the length of the center circumferential groove 11, the edge of which is formed by the inner side circumferential edge portion 52 with respect to the road contact surface 3 is increased, and thus the volume of snow that can enter the center circumferential groove 11 can be increased. This allows snow column shear force to be improved, allowing running performance on snow road surfaces to be improved. Thus, performance on ice and snow can be more reliably improved.

In addition, the relationship between the distance Lh in the tire circumferential direction between the intersection points α and β that are respective intersection points of the width direction edge portions 40 on both the sides in the tire circumferential direction with the inner side circumferential edge portion 52, and the distance L3 in the tire circumferential direction between the intersection point α and the circumferential bent portion 53 is in the range $0.4 \leq (L3/Lh) \leq 0.6$. Thus, the rigidity of the center land portion 31 can be made uniform. In other words, in a case where the relationship between the distance Lh between the intersection points α and β and the distance L3 between the intersection point α and the circumferential bent portion 53 is $(L3/Lh) < 0.4$ or $(L3/Lh) > 0.6$, a position of the circumferential bent portion 53 in the tire circumferential direction may be too biased in any direction in the tire circumferential direction. In this case, the rigidity of the center land portion 31 can be largely biased depending on the position in the tire circumferential direction, and deformation of the center land portion 31 in reaction to a load is likely to largely differ depending on the position in the tire circumferential direction. Thus, uneven wear may be easily generated.

In contrast, in a case where the relationship between the distance Lh between the intersection points α and β and the distance L3 between the intersection point α and the circumferential bent portion 53 is in the range $0.4 \leq (L3/Lh) \leq 0.6$, a bias in position of the circumferential bent portion 53 in the tire circumferential direction can be suppressed, and the rigidity of the center land portion 31 can be made uniform. As a result, dry performance can be more reliably improved while the occurrence of uneven wear is suppressed.

Further, the relationship between the distance wα in the tire width direction between the intersection point α and the circumferential bent portion 53, and the maximum width wb of the land portion 30 in the tire width direction is in the range $0.1 \leq (w\alpha/wb) \leq 0.2$, and the relationship between the distance wβ in the tire width direction between the intersection point β and the circumferential bent portion 53, and the maximum width wb of the land portion 30 in the tire width direction is $0.1 \leq (w\beta/wb) \leq 0.2$. Thus, running performance on icy road surfaces can be more reliably improved or running performance on snow road surfaces can be improved while the rigidity of the circumferential bent portion 53 of the center land portion 31 is ensured.

In other words, in a case where the relationship between the distance w a between the intersection point α and the circumferential bent portion 53, and the maximum width wb of the land portion 30 is $(w\alpha/wb) < 0.1$ or the relationship between the distance wβ between the intersection point β and the circumferential bent portion 53, and the maximum width wb of the land portion 30 is $(w\beta/wb) < 0.1$, the projection amount of the circumferential bent portion 53 may be too small. In this case, even providing the circumferential bent portion 53 has difficulty in increasing the edge components of the inner side circumferential edge portion 52 and thus may have difficulty in effectively improving running performance on icy road surfaces. Also, in this case, even providing the circumferential bent portion 53 on the inner side circumferential edge portion 52 has difficulty in effectively increasing the length of the center circumferential groove 11, thus has difficulty in improving snow column shear force, and may have difficulty in effectively improving running performance on snow road surfaces. Furthermore, in a case where the relationship between the distance $w\alpha$ between the intersection point $\alpha$ and the circumferential bent portion 53, and the maximum width wb of the land portion 30 is $(w\alpha/wb)>0.2$ or the relationship between the distance $w\beta$ between the intersection point $\beta$ and the circumferential bent portion 53, and the maximum width wb of the land portion 30 is $(w\beta/wb)>0.2$, the projection amount of the circumferential bent portion 53 may be too large. Thus, it may be difficult to ensure the rigidity of a portion of the center land portion 31, which is located near the circumferential bent portion 53. In this case, uneven wear may be easily generated due to the too low rigidity of the portion located near the circumferential bent portion 53.

In contrast, in a case where the relationship between the distance $w\alpha$ between the intersection point a and the circumferential bent portion 53, and the maximum width wb of the land portion 30 is in the range $0.1\leq(w\alpha/wb)\leq0.2$ and the relationship between the distance $w\beta$ between the intersection point $\beta$ and the circumferential bent portion 53, and the maximum width wb of the land portion 30 is in the range $0.1\leq(w\beta/wb)\leq0.2$, the edge components of the inner side circumferential edge portion 52 are increased while the rigidity of the portion located near the circumferential bent portion 53 is ensured. Thus, running performance on icy road surfaces can be improved. In addition, the length of the center circumferential groove 11 is increased, and thus running performance on snow road surfaces can be improved. As a result, performance on ice and snow can be more reliably improved while the occurrence of uneven wear is suppressed.

Further, the relationship between the width w1 in the tire width direction from the outermost side position 36 to the outer bent portion 42 and the maximum width wb of the land portion 30 in the tire width direction satisfies $(w1/wb)\geq0.3$, and the relationship between the width w2 in the tire width direction from the innermost side position 37 to the inner bent portion 43 and the maximum width wb of the land portion 30 in the tire width direction satisfies $(w2/wb)\geq0.1$. Thus, the rigidity of any of a position of the center land portion 31, which is located closer to the outer side in the tire width direction and a position of the center land portion 31, which is located closer to the inner side in the tire width direction can be set to an appropriate level. In other words, in a case where the relationship between the width w1 from the outermost side position 36 to the outer bent portion 42 and the maximum width wb of the land portion 30 is $(w1/wb)<0.3$, the width w1 from the outermost side position 36 to the outer bent portion 42 is too small. Thus, it may be difficult to ensure the rigidity of a position of the center land portion 31, which is located closer to the outer side in the tire width direction. In this case, when a large load acts on a position of the center land portion 31, which is located closer to the outer side in the tire width direction at the time of cornering or lane changing, it may be difficult to suppress deformation of the center land portion 31. Also, in a case where the relationship between the width w2 from the innermost side position 37 to the inner bent portion 43 and the maximum width wb of the land portion 30 is $(w2/wb)<0.1$, the width w2 from the innermost side position 37 to the inner bent portion 43 is too small. Thus, the rigidity of a position of the center land portion 31, which is located closer to the inner side in the tire width direction may be too low. In this case, the difference between the rigidity of a position of the center land portion 31, which is located closer to the inner side in the tire width direction and the rigidity of a position of the center land portion 31, which is located closer to the outer side in the tire width direction may be too large, and uneven wear may be easily generated due to the too large rigidity difference.

In contrast, in a case where the relationship between the width w1 from the outermost side position 36 to the outer bent portion 42 and the maximum width wb of the land portion 30 satisfies $(w1/wb)\geq0.3$ and the relationship between the width w2 from the innermost side position 37 to the inner bent portion 43 and the maximum width wb of the land portion 30 satisfies $(w2/wb)\geq0.1$, the rigidity of any of a position of the center land portion 31, which is located closer to the outer side in the tire width direction and a position of the center land portion 31, which is located closer to the inner side in the tire width direction can also be made appropriate. As a result, dry performance can be more reliably improved while the occurrence of uneven wear is suppressed.

Furthermore, the width w1 in the tire width direction from the outermost side position 36 to the outer bent portion 42 of the center land portion 31 and the width w2 in the tire width direction from the innermost side position 37 to the inner bent portion 43 of the center land portion 31 satisfy the relationship $(w1/w2)\leq5$. Thus, the difference between the rigidity of a position of the center land portion 31, which is located closer to the outer side in the tire width direction and the rigidity of a position of the center land portion 31, which is located closer to the inner side in the tire width direction can be prevented from being too large. In other words, in a case where the relationship between the width w1 from the outermost side position 36 to the outer bent portion 42 of the center land portion 31 and the width w2 from the innermost side position 37 to the inner bent portion 43 of the center land portion 31 is $(w1/w2)>5$, the difference between the rigidity of a position of the center land portion 31, which is located closer to the inner side in the tire width direction and the rigidity of a position of the center land portion 31, which is located closer to the outer side in the tire width direction may be too large. In this case, uneven wear may be easily generated due to the too large rigidity difference.

In contrast, in a case where the relationship between the width w1 from the outermost side position 36 to the outer bent portion 42 of the center land portion 31 and the width w2 from the innermost side position 37 to the inner bent portion 43 of the center land portion 31 satisfy $(w1/w2)\leq5$, the width w1 from the outermost side position 36 of the center land portion 31 to the outer bent portion 42 and the width w2 from the innermost side position 37 to the inner bent portion 43 satisfies the relationship $(w1/w2)\leq5$, the difference between the rigidity of a position of the center land portion 31, which is located closer to the outer side in the tire width direction and the rigidity of a position of the center land portion 31, which is located closer to the inner side in the tire width direction may be prevented from being too large. As a result, the occurrence of uneven wear may be more reliably suppressed.

Additionally, the relationship between the distance Lk in the tire circumferential direction between the outer bent portion 42 and the inner bent portion 43 of the center land portion 31, and the entire length Lb of the land portion 30 in the tire circumferential direction is in the range $0.05\leq(Lk/Lb)\leq0.2$. Thus, running performance on icy road surfaces can be more reliably improved while the rigidity of a portion of the center land portion 31, which is located near the width direction edge portion 40 is ensured. In addition, running performance on snow road surfaces can be improved. In other words, in a case where the relationship between the distance Lk in the tire circumferential direction between the outer bent portion 42 and the inner bent portion 43, and the entire length Lb of the land portion 30 in the tire circumferential direction is (Lk/Lb)<0.05, the distance Lk in the tire circumferential direction between the outer bent portion 42 and the inner bent portion 43 is too small. Thus, even forming the plurality of width direction bent portions 41 on the width direction edge portion 40 may have difficulty in increasing the length of the edge and the length of the center lug groove 16. In this case, it is difficult to effectively improve the edge effect due to the long edge length of the width direction edge portion 40 and the snow column shear force due to the long length of the center lug groove 16, and thus, it may be difficult to effectively improve performance on ice and snow. Also, in a case where the relationship between the distance Lk in the tire circumferential direction between the outer bent portion 42 and the inner bent portion 43, and the entire length Lb of the land portion 30 in the tire circumferential direction is (Lk/Lb) >0.2, the distance Lk of the outer bent portion 42 in the tire circumferential direction and the inner bent portion 43 is too large. Thus, the rigidity of a portion of the center land portion 31, which is located near the width direction edge portion 40 may be too low. In this case, the difference between the rigidity of a portion of the center land portion 31, which is located near the width direction edge portion 40 and the rigidity of a position other than the width direction edge portion 40 may be too large, and uneven wear may be easily generated due to the too large rigidity difference.

In contrast, in a case where the relationship between the distance Lk in the tire circumferential direction between the outer bent portion 42 and the inner bent portion 43, and the entire length Lb of the land portion 30 in the tire circumferential direction is in the range 0.05≤(Lk/Lb)<0.2, the edge components of the width direction edge portion 40 are increased while the rigidity of the portion located near the width direction edge portion 40 is ensured. Accordingly, running performance on icy road surfaces is improved, and the length of the center lug groove 16 is increased. Thus, running performance on snow road surfaces can be improved. As a result, performance on ice and snow can be more reliably improved while the occurrence of uneven wear is suppressed.

Modified Examples

Note that in the embodiment described above, the width direction edge portions 40 are formed at two locations, but the width direction bent portions 41 may be formed at three or more locations on the single width direction edge portion 40. For the width direction edge portion 40, the outer bent portion 42 and the inner bent portion 43 that are the width direction bent portion 41 closest to the land portion center line CB are formed on both the respective sides of the land portion 30 in the tire width direction from the land portion center line CB, and the width direction bent portion 41 other than the outer bent portion 42 and the inner bent portion 43 may be further formed. In other words, another width direction bent portion 41 may be formed on the opposite side of the side where the land portion center line CB is located with respect to the outer bent portion 42, and another width direction bent portions 41 may be formed on the opposite side of the side where the land portion center line CB is located with respect to the inner bent portion 43.

Additionally, in the embodiment described above, by bending the width direction edge portion 40 anglewise, the width direction bent portions 41 are formed. By bending the inner side circumferential edge portion 52 anglewise, the circumferential bent portion 53 is formed. However, the width direction bent portion 41 and the circumferential bent portion 53 do not have to be formed anglewise. The width direction bent portion 41 and the circumferential bent portion 53 are curved, for example, with a small radius of curvature and thus may be formed in a bending manner by bending the width direction edge portion 40 and the inner side circumferential edge portion 52.

Moreover, in the embodiment described above, the three circumferential grooves 10 are disposed; however, the number of circumferential grooves 10 may be three or less or three or more. The number of circumferential grooves 10 may be, for example, two or four or more. The width direction edge portion 40 including the plurality of width direction bent portions 41 may be the edge portion 35 of the lug groove 15 that defines both the sides of the center land portion 31 in the tire circumferential direction when the land portion 30 located on the inner side of the outermost circumferential groove 12 in the tire width direction that is the circumferential groove 10 located on the outermost side in the tire width direction is the center land portion 31. In other words, as long as the land portion 30 including the width direction edge portions 40 each provided with the plurality of width direction bent portions 41 is the land portion 30 located on the inner side of the outermost circumferential groove 12 in the tire width direction, the position thereof does not matter.

In the embodiment described above, although the pneumatic tire 1 is used for description as an example of the tire according to the embodiment of the present technology, the tire according to the embodiment of the present technology may be a tire other than the pneumatic tire 1. The tire according to the embodiment of the present technology may be, for example, a so-called airless tire that can be used without filling a gas.

EXAMPLES

FIGS. 5A to 5C are tables each showing the results of performance evaluation tests of pneumatic tires. In relation to the pneumatic tire 1 described above, description will be given of performance evaluation tests conducted on a pneumatic tire according to Conventional Example, the pneumatic tires 1 according to embodiments of the present technology, and pneumatic tires according to Comparative Examples to be compared with pneumatic tires 1 according to the embodiments of the present technology. The performance evaluation tests were performed on tests of dry performance that is running performance on dry road surfaces, wet performance that is running performance on wet road surfaces, and performance on ice and snow that is running performance on icy and snowy road surfaces.

The performance evaluation tests were performed by assembling pneumatic tires 1 each having a tire nominal size of 195/65R1591T specified by JATMA on JATMA standard rim wheels each having a rim size of 15×6.0 J, mounting the test tires on an evaluation vehicle that is a front-wheel passenger vehicle of 1400 cc displacement, adjusting air pressure to 230 kPa for front wheels and to 220 kPa for rear wheels, and then running on the evaluation vehicle.

In evaluation methods for test items, for dry performance, steering stability was compared in a sensory evaluation by a test driver when the evaluation vehicle on which the test tires were mounted was driven on dry road surfaces of a test course. The dry performance is evaluated by expressing the sensory evaluation by the test driver with Conventional Example described below being assigned the value of 100. Larger index values indicate higher steering stability on dry road surfaces and superior dry performance.

Further, for wet performance, steering stability was compared in a sensory evaluation by a test driver when the evaluation vehicle on which the test tires were mounted was driven on wet handling road surfaces of a test course on which water was sprayed to a water depth of 1 mm. The wet performance is evaluated by expressing the sensory evaluation by the test driver as an index value with Conventional Example described below being assigned the value of 100. Larger index values indicate higher steering stability on wet road surfaces and superior wet performance.

Furthermore, for performance on ice and snow, traction characteristics and steering stability were compared in a sensory evaluation by a test driver when the evaluation vehicle on which the test tires were mounted was driven on compacted snow handling road surfaces of a test course. The performance on ice and snow is evaluated by expressing the sensory evaluation by the test driver as an index values with the Conventional Example described below being assigned the value of 100. Larger index values indicate higher traction characteristics and higher steering stability on icy and snowy road surfaces, and superior performance on ice and snow.

The performance evaluation tests were performed on 21 types of pneumatic tires including a pneumatic tire according to Conventional Example as an example of a conventional pneumatic tire, Examples 1 to 17 corresponding to the pneumatic tires 1 according to the present technology, and Comparative Examples 1 to 3 corresponding to pneumatic tires to be compared with the pneumatic tires 1 according to the present technology. Of these tires, in Conventional Example, the width w1 in the tire width direction from the outermost side position 36 to the outer bent portion 42 of the land portion 30 is equal to the width w2 in the tire width direction from the innermost side position 37 to the inner bent portion 43 of the land portion 30. Further, in Comparative Example 1, the relationship between the width w1 in the tire width direction from the outermost side position 36 to the outer bent portion 42 of the land portion 30 and the width w2 in the tire width direction from the innermost side position 37 to the inner bent portion 43 of the land portion 30 is w2>w1. Additionally, in Comparative Example 2, the relationship between the maximum width wb of the land portion 30 and the width wc in the tire width direction between the outer bent portion 42 and the inner bent portion 43 is (wc/wb)<0.2 while the relationship between the width w1 in the tire width direction from the outermost side position 36 to the outer bent portion 42 of the land portion 30 and the width w2 in the tire width direction from the innermost side position 37 to the inner bent portion 43 of the land portion 30 is w2<w1. Additionally, in Comparative Example 3, the relationship between the maximum width wb of the land portion 30 and the width wc in the tire width direction between the outer bent portion 42 and the inner bent portion 43 is (wc/wb)>0.6 while the relationship between the width w1 in the tire width direction from the outermost side position 36 to the outer bent portion 42 of the land portion 30 and the width w2 in the tire width direction from the innermost side position 37 to the inner bent portion 43 of the land portion 30 is w2<w1.

In contrast, in all Examples 1 to 17 as examples of the pneumatic tire 1 according to the present technology, the relationship between the width w1 in the tire width direction from the outermost side position 36 to the outer bent portion 42 of the land portion 30 and the width w2 in the tire width direction from the innermost side position 37 to the inner bent portion 43 satisfies w2<w1, and the relationship between the maximum width wb of the land portion 30 and the width wc in the tire width direction between the outer bent portion 42 and the inner bent portion 43 is in the range 0.2≤(wc/wb)≤0.6. Furthermore, the pneumatic tires 1 according to Examples 1 to 17 differ in that whether the outer side circumferential edge portion 51 has a straight shape and whether the inner side circumferential edge portion 52 includes the circumferential bent portion 53, and differ in the ratio (L3/Lh) of the distance L3 in the tire circumferential direction between the intersection point α and the circumferential bent portion 53 with respect to the distance Lh in the tire circumferential direction between the intersection points α and β, the ratio (wα/wb) of the distance wα in the tire width direction between the intersection point α and the circumferential bent portion 53 with respect to the maximum width wb of the land portion 30, the ratio (wβ/wb) of the distance wβ in the tire width direction between the intersection point β and the circumferential bent portion 53 with respect to the maximum width wb of the land portion 30, the ratio (w1/wb) of the width w1 in the tire width direction from the outermost side position 36 to the outer bent portion 42 with respect to the maximum width wb of the land portion 30, and the ratio (w2/wb) of the width w2 in the tire width from the innermost side position 37 to the inner bent portion 43 with respect to the maximum width wb of the land portion 30.

As a result of performing the performance evaluation tests by using the pneumatic tires 1, as illustrated in FIGS. 5A to 5C, it is revealed that the pneumatic tires 1 according to Examples 1 to 17 can suppress a reduction in any performance of dry performance and wet performance, and performance on ice and snow as compared with Conventional Example and Comparative Examples 1 to 3 and provide improved comprehensive performance of dry performance and wet performance, and performance on ice and snow. In other words, the pneumatic tires 1 according to Examples 1 to 17 can satisfy dry performance, wet performance, and performance on ice and snow.

The invention claimed is:

1. A tire, comprising:

a plurality of circumferential grooves extending in a tire circumferential direction;

a plurality of lug grooves extending in a tire width direction; and a plurality of land portions each having both sides in the tire width direction defined by the circumferential grooves and both sides in the tire circumferential direction defined by the lug grooves;

width direction edge portions of the land portions that correspond to edge portions of the lug grooves extending in the tire width direction and comprising a plurality of width direction bent portions bent in the tire circumferential direction, of the plurality of width direction bent portions of one of the width direction edge portions, a width direction bent portion that is disposed on an outer side in the tire width direction with respect to a land portion center line passing through a center of the land portions in the tire width direction and is closest to the land portion center line being an outer bent portion, of the plurality of width direction bent portions of the one of the width direction edge portions, a width direction bent portion that is disposed on an inner side in the tire width direction with respect to the land portion center line and is closest to the land portion center line being an inner bent portion, the width direction edge portions comprising a portion between the outer bent portion and the inner bent portion linearly formed, the land portions having a width w1 in the tire width direction from the outermost side position to the outer bent portion of the land portions in the tire width direction and a width w2 in the tire width direction from the innermost side position to the inner bent portion of the land portions in the tire width direction, the width w1 and the width w2 having a relationship satisfying w2<w1, a maximum width wb of the land portions in the tire width direction and a width wc between the outer bent portion and the inner bent portion in the tire width direction having a relationship in a range $0.2 \leq (wc/wb) \leq 0.6$, a width w1 in the tire width direction from the outermost side position to the outer bent portion and the maximum width wb of the land portions in the tire width direction having a relationship satisfying $(w1/wb) \geq 0.3$, a width w2 from the innermost side position to the inner bent portion in the tire width direction and the maximum width wb of the land portions in the tire width direction having a relationship satisfying $(w2/wb) \geq 0.1$, and the relationship of the width w1 to the maximum width wb and the relationship of the width w2 to the maximum width wb satisfying a relationship $0.15 \leq (w1/wb) - (w2/wb)$.

2. The tire according to claim 1, wherein of circumferential edge portions that correspond to edge portions of the circumferential grooves and are located on both the sides of the land portions in the tire width direction, an outer side circumferential edge portion that is the circumferential edge portion on the outer side in the tire width direction is formed in a straight shape extending in the tire circumferential direction.

3. The tire according to claim 2, wherein of the circumferential edge portions that correspond to the edge portions of the circumferential grooves and are located on both the sides of the land portions in the tire width direction, an inner side circumferential edge portion that is the circumferential edge portion on the inner side in the tire width direction comprises a circumferential bent portion that is bent projecting toward the inner side in the tire width direction.

4. The tire according to claim 3, wherein of the width direction edge portions located on both the sides of the land portions in the tire circumferential direction, an intersection point between one of the width direction edge portions and the inner side circumferential edge portion is an intersection point α, an intersection point between the other of the width direction edge portions and the inner side circumferential edge portion is an intersection point β, and a distance Lh between the intersection points α and β in the tire circumferential direction and a distance L3 between the intersection point α and the circumferential bent portion in the tire circumferential direction have a relationship in a range $0.4 \leq (L3/Lh) \leq 0.6$.

5. The tire according to claim 4, wherein a distance wα between the intersection point α and the circumferential bent portion in the tire width direction and the maximum width wb of the land portions in the tire width direction have a relationship in a range $0.1 \leq (w\alpha/wb) \leq 0.2$, and a distance wβ between the intersection point β and the circumferential bent portion in the tire width direction and the maximum width wb of the land portions in the tire width direction have a relationship in a range $0.1 \leq (w\beta/wb) \leq 0.2$.

6. The tire according to claim 5, wherein a distance Lk between the outer bent portion and the inner bent portion in the tire circumferential direction and an entire length Lb of the land portions in the tire circumferential direction have a relationship in a range $0.05 \leq (Lk/Lb) \leq 0.2$.

7. The tire according to claim 1, wherein of the circumferential edge portions that correspond to the edge portions of the circumferential grooves and are located on both the sides of the land portions in the tire width direction, an inner side circumferential edge portion that is the circumferential edge portion on the inner side in the tire width direction comprises a circumferential bent portion that is bent projecting toward the inner side in the tire width direction.

8. The tire according to claim 3, wherein of the width direction edge portions located on both the sides of the land portions in the tire circumferential direction, an intersection point between one of the width direction edge portions and the inner side circumferential edge portion is an intersection point α, an intersection point between the other of the width direction edge portions and the inner side circumferential edge portion is an intersection point β, and a distance Lh between the intersection points α and β in the tire circumferential direction and a distance L3 between the intersection point α and the circumferential bent portion in the tire circumferential direction have a relationship in a range $0.4 \leq (L3/Lh) \leq 0.6$.

9. The tire according to claim 8, wherein a distance wα between the intersection point α and the circumferential bent portion in the tire width direction and the maximum width wb of the land portions in the tire width direction have a relationship in a range $0.1 \leq (w\alpha/wb) \leq 0.2$, and a distance wβ between the intersection point β and the circumferential bent portion in the tire width direction and the maximum width wb of the land portions in the tire width direction have a relationship in a range $0.1 \leq (w\beta/wb) \leq 0.2$.

10. The tire according to claim 1, wherein a distance Lk between the outer bent portion and the inner bent portion in the tire circumferential direction and an entire length Lb of the land portions in the tire circumferential direction have a relationship in a range $0.05 \leq (Lk/Lb) \leq 0.2$.

11. A tire, comprising:

a plurality of circumferential grooves extending in a tire circumferential direction;

a plurality of lug grooves extending in a tire width direction; and a plurality of land portions each having both sides in the tire width direction defined by the circumferential grooves and both sides in the tire circumferential direction defined by the lug grooves;

width direction edge portions of the land portions that correspond to edge portions of the lug grooves extending in the tire width direction and comprising a plurality of width direction bent portions bent in the tire circumferential direction, of the plurality of width direction bent portions of one of the width direction edge portions, a width direction bent portion that is disposed on an outer side in the tire width direction with respect to a land portion center line passing through a center of the land portions in the tire width direction and is closest to the land portion center line being an outer bent portion, of the plurality of width direction bent portions of the one of the width direction edge portions, a width direction bent portion that is disposed on an inner side in the tire width direction with respect to the land portion center line and is closest to the land portion center line being an inner bent portion, the width direction edge portions comprising a portion between the outer bent portion and the inner bent portion linearly formed, the land portions having a width w1 in the tire width direction from the outermost side position to the outer bent portion of the land portions in the tire width direction and a width w2 in the tire width direction from the innermost side position to the inner bent portion of the land portions in the tire width direction, the width w1 and the width w2 having a relationship satisfying $w2<w1$, a maximum width wb of the land portions in the tire width direction and a width wc between the outer bent portion and the inner bent portion in the tire width direction having a relationship in a range $0.2 \leq (wc/wb) \leq 0.6$, of the circumferential edge portions that correspond to the edge portions of the circumferential grooves and are located on both the sides of the land portions in the tire width direction, an inner side circumferential edge portion that is the circumferential edge portion on the inner side in the tire width direction comprising a single circumferential bent portion that is bent projecting toward the inner side in the tire width direction, and of circumferential edge portions that correspond to edge portions of the circumferential grooves and are located on both the sides of the land portions in the tire width direction, an outer side circumferential edge portion that is the circumferential edge portion on the outer side in the tire width direction is formed in a straight shape extending in the tire circumferential direction.

12. The tire according to claim 11, wherein of circumferential edge portions that correspond to edge portions of the circumferential grooves and are located on both the sides of the land portions in the tire width direction, an outer side circumferential edge portion that is the circumferential edge portion on the outer side in the tire width direction is formed in a straight shape extending in the tire circumferential direction.

13. A tire, comprising:

a plurality of circumferential grooves extending in a tire circumferential direction;

a plurality of lug grooves extending in a tire width direction; and a plurality of land portions each having both sides in the tire width direction defined by the circumferential grooves and both sides in the tire circumferential direction defined by the lug grooves;

width direction edge portions of the land portions that correspond to edge portions of the lug grooves extending in the tire width direction and comprising a plurality of width direction bent portions bent in the tire circumferential direction, of the plurality of width direction bent portions of one of the width direction edge portions, a width direction bent portion that is disposed on an outer side in the tire width direction with respect to a land portion center line passing through a center of the land portions in the tire width direction and is closest to the land portion center line being an outer bent portion, of the plurality of width direction bent portions of the one of the width direction edge portions, a width direction bent portion that is disposed on an inner side in the tire width direction with respect to the land portion center line and is closest to the land portion center line being an inner bent portion, the width direction edge portions comprising a portion between the outer bent portion and the inner bent portion linearly formed, the land portions having a width w1 in the tire width direction from the outermost side position to the outer bent portion of the land portions in the tire width direction and a width w2 in the tire width direction from the innermost side position to the inner bent portion of the land portions in the tire width direction, the width w1 and the width w2 having a relationship satisfying $w2<w1$, a maximum width wb of the land portions in the tire width direction and a width wc between the outer bent portion and the inner bent portion in the tire width direction having a relationship in a range $0.2 \leq (wc/wb) \leq 0.6$, and a distance Lk between the outer bent portion and the inner bent portion in the tire circumferential direction and an entire length Lb of the land portions in the tire circumferential direction having a relationship in a range $0.05 \leq (Lk/Lb) \leq 0.20$, wherein the width direction edge portions have an inclination angle $\theta w$ in the tire width direction with respect to the tire circumferential direction in a range of 65° or more and 90° or less in any position.

* * * * *